United States Patent [19]

Crompton

[11] Patent Number: 5,058,342

[45] Date of Patent: * Oct. 22, 1991

[54] MOULDED COMPONENTS AND THEIR MANUFACTURE

[76] Inventor: Geoffrey Crompton, 55 Arbour Street, Southport, Merseyside, United Kingdom

[ * ] Notice: The portion of the term of this patent subsequent to Nov. 15, 2005 has been disclaimed.

[21] Appl. No.: 154,922

[22] Filed: Feb. 11, 1988

[30] Foreign Application Priority Data

Feb. 11, 1987 [GB] United Kingdom ............... 8703084

[51] Int. Cl.5 ............... B32B 5/30; B32B 7/02; B32B 33/00; E06B 5/16
[52] U.S. Cl. ............... 52/232; 52/309.13; 52/309.15; 52/776; 156/71; 156/108; 252/601; 252/606; 252/609; 428/192; 428/193; 428/325; 428/413; 428/417; 428/423.1; 428/425.6; 428/430; 428/480; 428/524; 428/920
[58] Field of Search ............... 52/232, 309.13, 309.15, 52/776; 156/71, 108; 428/192, 193, 325, 413, 417, 423.1, 425.6, 430, 480, 524, 920

[56] References Cited

U.S. PATENT DOCUMENTS 4,250,220 2/1981 Schlatter et al. ............... 428/920
4,277,532 7/1981 Czepel et al. ............... 428/920
4,463,043 7/1984 Reeves et al. ............... 428/920
4,600,634 7/1986 Langer ............... 52/232
4,622,251 11/1986 Gibb ............... 428/920
4,698,277 10/1987 Bayer ............... 428/920
4,729,853 3/1988 von Bonin ............... 428/920
4,746,555 5/1988 Luckanuck ............... 428/920
4,784,902 11/1988 Crompton ............... 428/920

FOREIGN PATENT DOCUMENTS

2171135 A 2/1985 United Kingdom .
WO82/04419 12/1982 World Int. Prop. O. .

Primary Examiner—James C. Cannon
Attorney, Agent, or Firm—Fulwider, Patton, Rieber, Lee & Utecht

[57] ABSTRACT

A glazing bead has an outer skin formed in two parts. The two parts are formed by moulding a cloth or paper of glass fibre or other suitable fibrous material impregnated with phenolic resin containing one or more frits and ceramic powder or fibre. The two moulded parts are joined together and the resultant cavity therebetween filled with a mixture of phenolic resin containing one or more frits and ceramic powder or fibre, or sodium silicate containing one or more frits and ceramic powder or fibre.

11 Claims, 3 Drawing Sheets

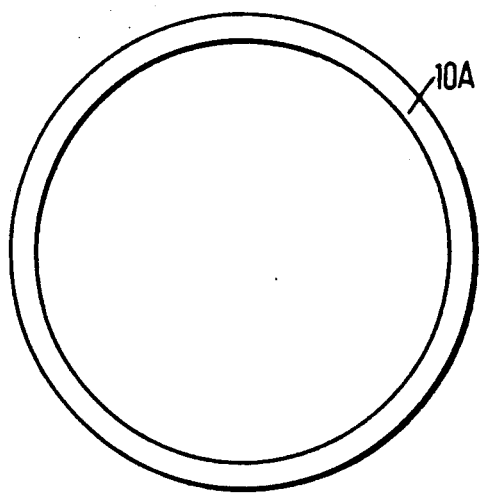
FIG.1
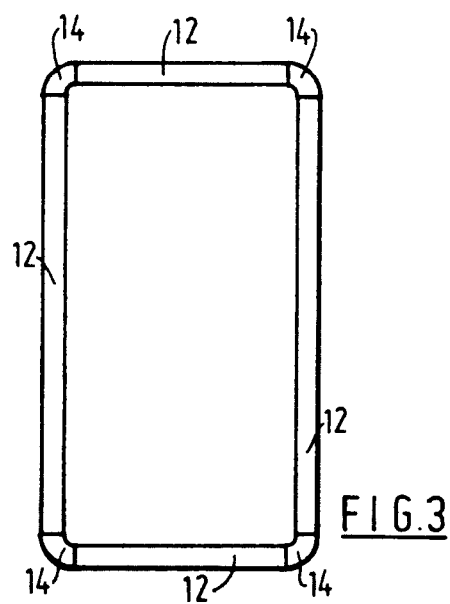
FIG.3
FIG.2
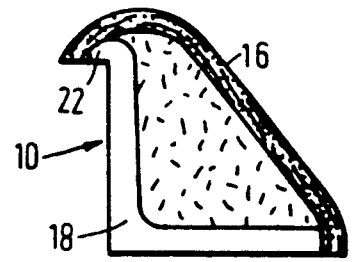
FIG.4
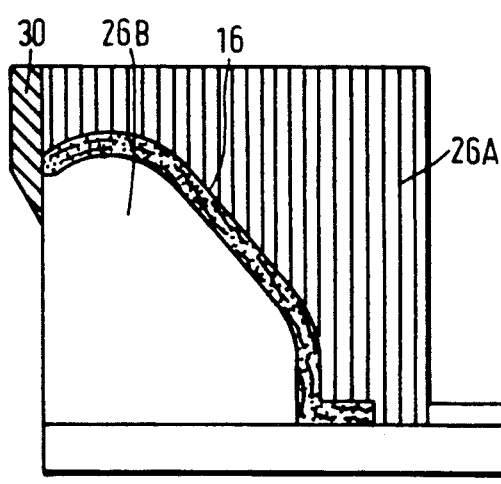
FIG.5

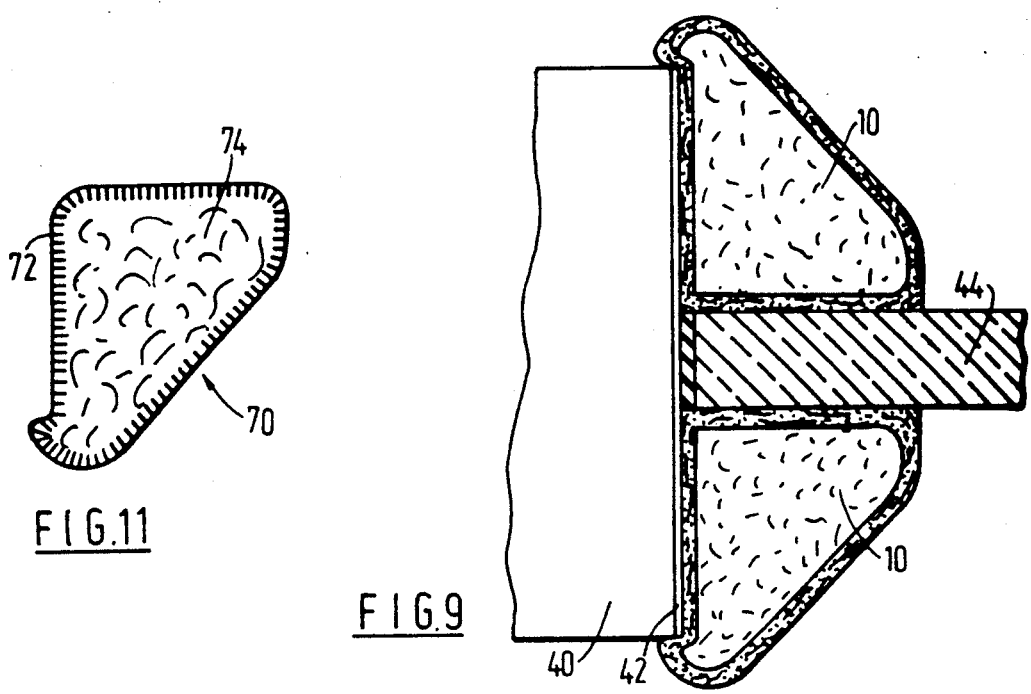
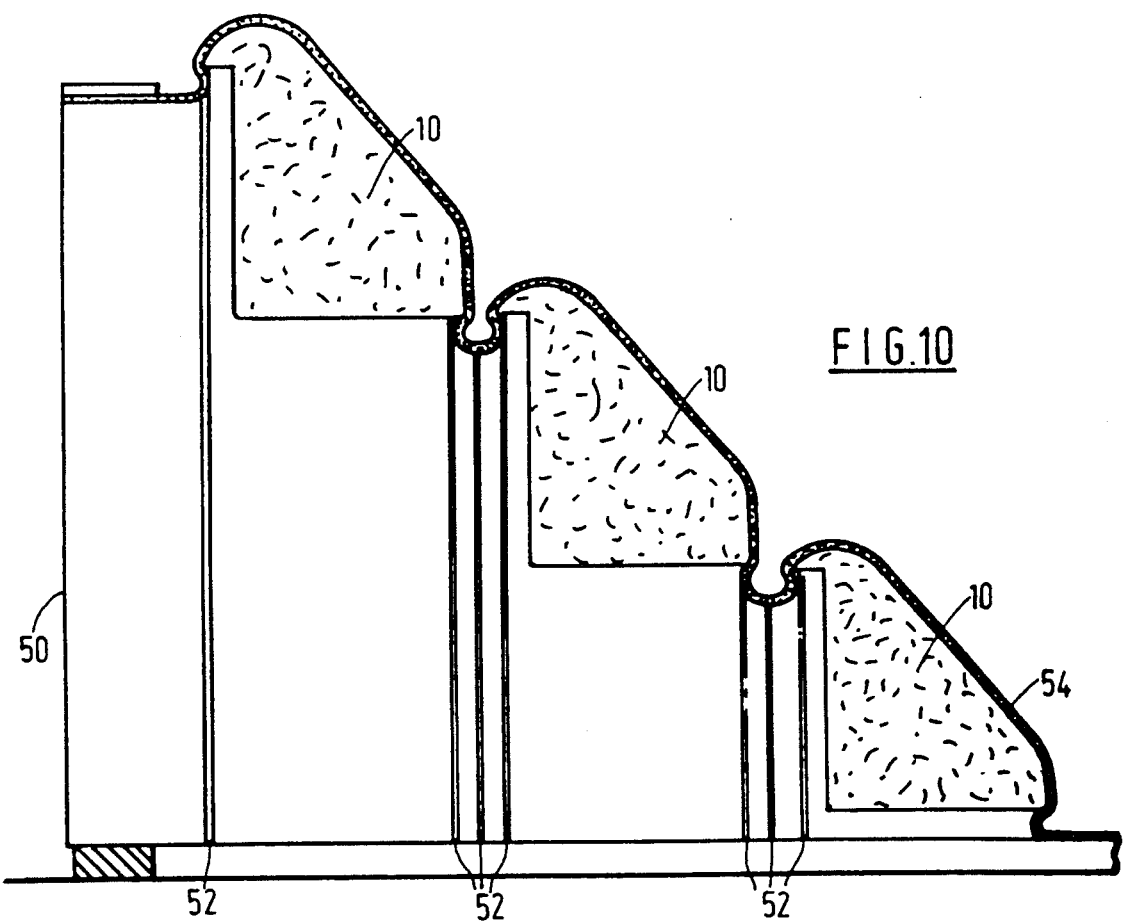

MOULDED COMPONENTS AND THEIR MANUFACTURE

The invention concerns moulded components and their manufacture with particular reference to glazing beads and other products to conform with B.S. Fire Test 478.

Glazing beads that hold glass in apertures of fire doors are conventionally made from hard wood. These, when subjected to test, usually burn away within thirty minutes, leaving the bead fixing screws to hold the glass in place. Thus, flames and fumes can penetrate the gaps left between the glass and the surrounding material.

The use of alternative materials to wood is also not satisfactory as, for example, steel buckles, aluminium, melts and buckles, and mica based products shatter when struck or put under pressure by screws.

The object of this invention is to provide moulded components, particularly glazing beads, and means of manufacturing same.

According to this invention there is provided a moulded component comprising an outer skin and a filling of resin and/or sodium silicate containing one or more frits and ceramic or glass material.

The invention also provides a method of making moulded components comprising forming an outer skin with a filling of a mixture of resin and/or sodium silicate containing one or more frits and ceramic or glass material.

In a first preferred embodiment an outer skin in two halves is formed by pre-impregnating a glass cloth or cloth or paper of fibrous material with a mixture of resin, one or more frits of varying melt temperature, ceramic fibre and/or ceramic powder. This material is laid into a matched mould or moulds, with male and female forms leaving a material thickness cavity, and pressed by conventional means. The temperature of the tool may be controlled at such a level as to aid in the setting of the resin mix.

A suitable catalyst may be included in the resin to aid the setting process. Suitable resins include phenolic resins and, with the addition of additives, such as antimony oxide or alumina trihydrate, polyesters, epoxies and urethane methacrylates.

A second preferred route to producing the skin may be to use polyester resin and antimony oxide with the addition of the frits, ceramic, and glass/basalt fibre as already specified. A gel coat may be laid into the tool using the conventional glass fibre lay-up techniques of hand lay-up or spray and cured.

A third preferred way of producing the outer skin of the components of the invention may be by vacuum forming a preferably fire retardant thermoplastic sheet, such as of P.V.C., into a female mould.

A further preferred method of producing the outer skin may be to extrude a suitable thermoplastic sleeve as a hollow section with the appropriate outer profile. The tube can be cured in straight lengths but could also be held in a shaped mould to produce, for example, a circular bead, or indeed any shape desired.

Alternatively a suitable thermoplastic sleeve in the form of constant walled circular section may be formed into the desired profile, as well as the preferred overall shape, compressed into a matched mould whilst setting.

The skin is filled, say in a jig if necessary, with a mix of say foamed or unfoamed phenolic resin and catalyst together with a preferably high loading of frit or frits, ceramic fibre and/or powder and possibly a strengthening inclusion of E glass strand and optionally basalt fibre. The latter two fibres are preferably of greater length than the ceramic fibre and are intended to give coherence and impact resistance to the mix. When heated, such as in a fire situation, the melting action of the frit or progressive melting of the frits and the insulating qualities of the ceramic, protects glass components and allows say glazing beads to survive over a long period under intense heat and flame.

An alternative filling for components of the invention may be sodium silicate and catalyst with frit or frits and ceramic fibre or powder when higher heat resistance is required.

In yet another preferred embodiment of the invention a dough moulding compound is prepared from a mixture of preferably low smoke and low toxic fume resin, such as phenolic resin or polyester resin, optionally alumina trihydrate, one or more, preferably two, frits and glass reinforcement, such as of chopped glass strand. The compound is then moulded under heat and pressure and the moulding operation causes a majority of the resin to form a skin leaving the remaining ingredients as a generally homogeneous filling. Preferably the moulding compound comprises a low melting frit, typically melting at 300–450 degrees C. and a devitrifying frit that melts at 700 to 800 degrees C. An advantage of the devitrifying frit is that after melting it sets and remains stable to over 1000 degrees C.

The preferred materials used in the components of the invention are chosen for low smoke emission, low toxic fume, and high stability under heat up to 1100 degrees C.

The outer skins may be reinforced, if desired, by a spray of resin material into the mould or moulds, followed by a sprayed build up of chopped strand mat, sometimes compressed, and cured by heat or catalyst or both, the skins so formed being subsequently filled.

A decorative finish may be applied to the components of the invention, such as of P.V.C. sheet which is available in a variety of colours and finishes such as metallic and wood grain before or after moulding. On other occasions a paint such as mentioned in patent applications Ser. Nos. 8608075 or 8615006 may be used as an outer finish.

The invention further provides a component of the invention in the form of a glazing bead.

Whilst particular reference has been made to the production of glazing beads, it will be appreciated that other items may be produced by the same techniques, such as slabs to provide such items as a rigid barrier in a fire panel construction, or on its own as a three dimensional work surface top, or a wall board as a flat sheet or with cast-in three dimensional forms.

Components of the invention particularly when filled with a sodium silicate mix, may be able to stand the temperatures needed to apply a vitreous enamel finish on outer faces.

For a lighter structure, the filling for components of the invention may include a size reduceable material, such as styrene beads which can be melted out during the curing process. This may give a strong foam construction which will lighten the overall weight of the moulding without restricting the strength.

This invention will now be further described, by way of example only, with reference to the accompanying drawings, in which:

FIGS. 1, 2 and 3 show various shapes of glazing bead made according to the invention;

FIG. 4 shows a section through one form of glazing bead;

FIGS. 5 and 6 show tools for moulding skin parts of the glazing bead of FIG. 4;

FIG. 9 is a section through part of a window opening of a fire door in which yet another form of glazing bead is used;

FIG. 10 shows apparatus for applying a decorative coating to glazing beads; and

FIG. 11 is a section through another form of moulded component.

Figure 6:
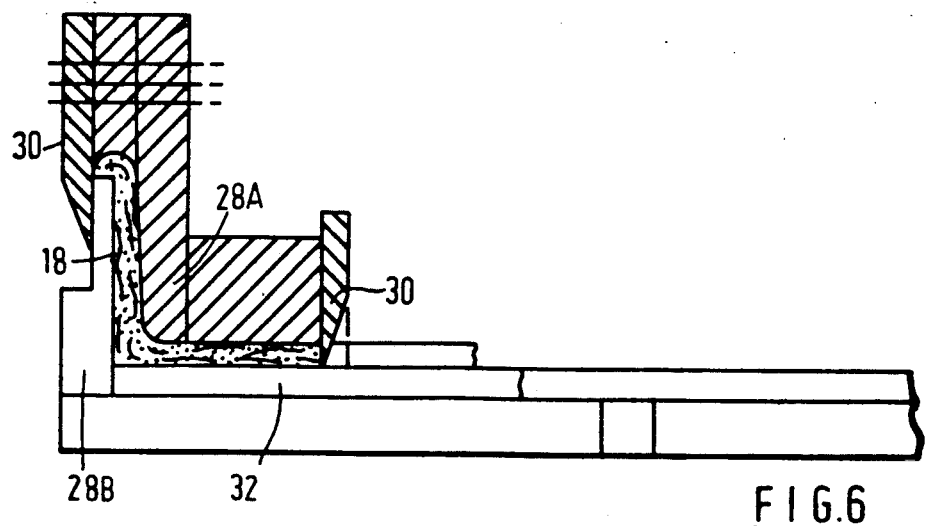

Referring to FIGS. 1, 2 and S, glazing beads 10 may be formed in a variety of shapes according to the desired shape of a window opening. FIG. 1 shows a continuous circular glazing bead 10A, FIG. 2 shows a continuous generally rectangular glazing bead 10B and FIG. 3 shows a generally rectangular glazing bead 10C formed from linear sections 12 and corner pieces 14.

Turning to FIG. 4, a glazing bead 10 is shown in section. The glazing bead 10 has an outer skin formed in two parts, namely an outer face 16 and an inner face 18, and a filling 20. The two faces 16 and 18 form together a generally triangular section glazing bead, the inner face 18 being generally L-shaped with a a lip 22 at one end and the outer face 16 has curved ends that overlie the ends of the inner face.

The two faces 16 and 18 are formed by moulding a cloth or paper of glass fibre or other suitable fibrous material that has been impregnated with phenolic resin that contains one or more frits and ceramic powder or fibre. This material is laid in matched moulds, i.e. 26A and 26B in FIG. 5 and 28A and 28B in FIG. 6, with male and female forms leaving a material thickness cavity and pressed by conventional means. The mould temperature is controlled at such a level as to aid setting of the resin.

Annular trimming blades 30 are shown in both FIGS. 5 and 6 for removing excess edge material from the moulded parts. The blades 30 have a generally elongated saw-toothed edge formation to facilitate passage through the material to be trimmed.

The same moulds may be used to produce glazing beads of different sizes for different widths of door. In FIG. 5, for example, the position at which the lower end of the skin 16 is trimmed may be varied. In FIG. 6, spacers 32 may be used to produce skins 14 of different heights and the position a which the lower end of the skin is trimmed may be varied.

The two skins 16 and 18 are joined together in a jig and the cavity therebetween filled with a mixture of phenolic resin containing one or more frits, ceramic fibre and/or powder, E glass strand and basalt fibre or sodium silicate containing one or more frits and ceramic fibre or powder and cured. Ends of filled mouldings being joined to form continuous glazing beads.

Figure 7:
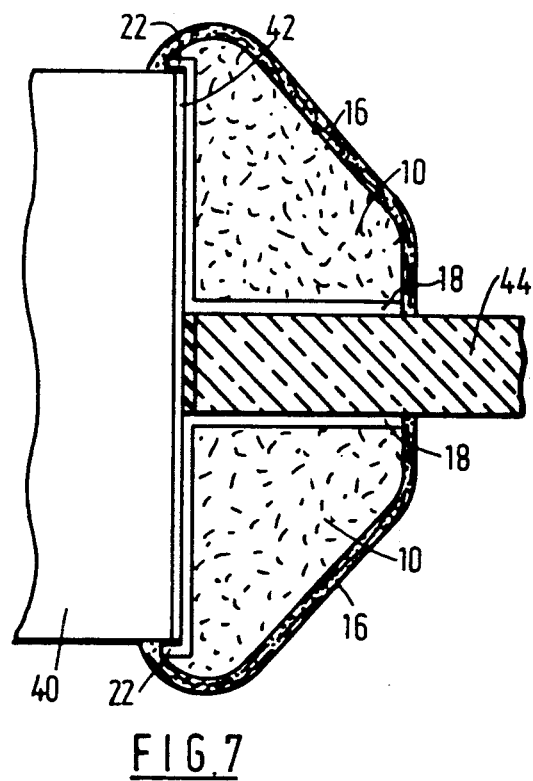
FIG. 7 is a section-through part of a window opening of a fire door in which glazing beads of FIG. 4 are used.

FIG. 7 shows glazing beads of FIG. 4 in use in a fire door 40. A window opening in the fire door is lined with intumescent material 42 and a sheet of glass 44 is held between two glazing beads 10, the limbs of the L-shaped inner faces 18 abutting the glass sheet 44 and the opening with their lips 22 extending around the edges of the opening onto the faces of the door.

Figure 8:
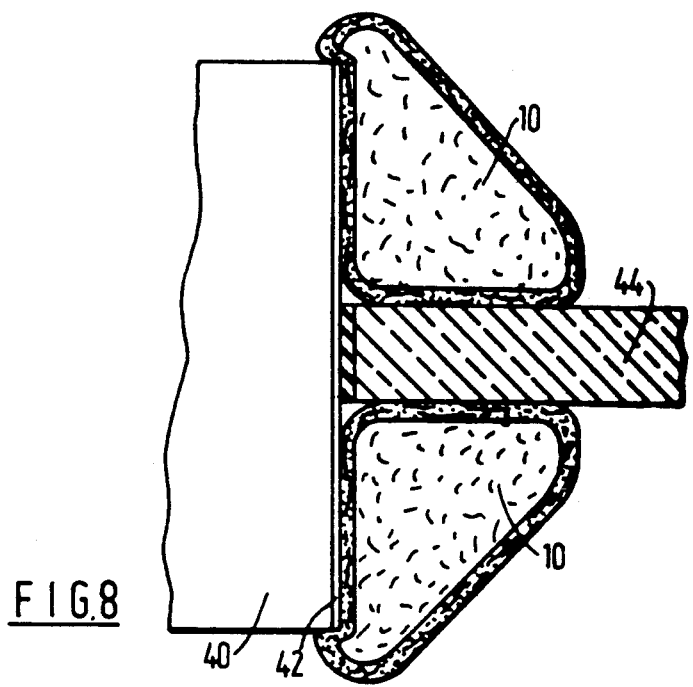
FIG. 8 is a section through part of a window opening of a fire door in which another form of glazing bead is used.

Turning to FIG. 8, the arrangement is substantially the same as that of FIG. 7, except that the glazing bead 10 has been formed in different manner. Rather than being formed of two outer parts, the glazing bead has been formed by extruding a circular section tube of thermoplastic resin and moulding that to the desired section before filling with the same material as the glazing bead of FIG. 4.

In FIG. 9, again the arrangement is similar to that of FIG. 7 except that the glazing bead skin has been formed in one piece by extruding thermoplastics resin in the desired sectional shape prior to filling with the same material as used for the glazing bead of FIG. 4.

The glazing beads of the embodiment of FIG. 8 can be seen to have curved edges as opposed to the glazing beads of the embodiment of FIG. 9 which can be produced with sharper edges.

FIG. 10 shows one way of providing a decorative coating on glazing beads 10 shown generally in a multiple operation. The glazing beads 10 are mounted on a stepped mould 50, sections of which are separated by vacuum suction passages 52 so that on application of a vacuum a decorative coating sheet 54 is pulled onto the glazing beads and over edges thereof. The decorative coating sheet 54 is then cut between the glazing beads to separate them.

Finally, FIG. 11 is a section through a moulded component 70 whose outer skin 72 is formed during the moulding process integrally with a filling 74. The component 70 is produced by moulding in a heated mould a mixture of 30 parts by weight low smoke/low toxic fume powdered polyester resin (an alternative would be phenolic resin), 30 parts by weight alumina trihydrate, 12 parts by weight of a low melting frit (300–450 degrees C.), 18 parts by weight of higher melting devitrifying frit (700–800 degrees C.) and 20 parts by weight of chopped glass strand that has been formed into a sheet or lump for moulding. Moulding is carried out at a temperature of 120 to 140 degrees C. and at a pressure of 140 to 150 psi.

During the moulding process resin flows to form a skin 72 conforming to the inside surface of the mould. Remaining resin and the other ingredients consolidate within the skin to form the filling 74.

I claim:

1. A configured fire-retardant element comprising:
    a molded outer skin layer; and
    a layer filling in the molded outer skin layer comprising a resin binder or sodium silicate binder, at least two frits capable of melting progressively when heated in a fire situation and additive solid material selected from the group consisting of ceramic fibers, glass fibers, basalt fibers, ceramic powders, and mixtures thereof.

2. A moulded component as claimed in claim 1, wherein the outer skin comprises resin impregnated cloth or fibrous material.

3. A moulded component as claimed in claim 2, wherein the impregnating resin contains one or more frits and ceramic material.

4. A moulded component as claimed in claim 2, wherein the impregnating resin is selected from the group consisting of phenolic resins, polyesters, epoxies and urethane methacrylates.

5. A moulded component as claimed in claim 4, wherein the impregnating resin further contains antimony oxide or alumina trihydrate.

6. A moulded component as claimed in claim 2, wherein the resin impregnated material of the outer skin is glass cloth or fibre.

7. A moulded component as claimed in claim 2, wherein the resin impregnated material of the outer skin is ceramic cloth or fiber.

8. A moulded component as claimed in claim 1, wherein the outer skin is of vacuum formed thermoplastic material.

9. A moulded component as claimed in claim 8, wherein the thermoplastic material is fire retardant.

10. A moulded component as claimed in claim 8, wherein the thermoplastic material is polyvinylchloride.

11. A moulded component as claimed in claim 1 in the form of a glazing bead.

* * * * *